US010854118B2

(12) United States Patent
DeBroux-Vincil et al.

(10) Patent No.: US 10,854,118 B2
(45) Date of Patent: Dec. 1, 2020

(54) STRUCTURAL SIGN MOUNTS FOR GUTTERS

(71) Applicants: Michelle Lee DeBroux-Vincil, Royal Oak, MI (US); William Vincil, Royal Oak, MI (US)

(72) Inventors: Michelle Lee DeBroux-Vincil, Royal Oak, MI (US); William Vincil, Royal Oak, MI (US)

( * ) Notice: Subject to any disclaimer, the term of this patent is extended or adjusted under 35 U.S.C. 154(b) by 0 days.

(21) Appl. No.: 16/400,742

(22) Filed: May 1, 2019

(65) Prior Publication Data

US 2019/0378439 A1    Dec. 12, 2019

Related U.S. Application Data

(60) Provisional application No. 62/763,276, filed on Jun. 11, 2018.

(51) Int. Cl.
| | |
|---|---|
| *F16M 13/00* | (2006.01) |
| *G09F 7/18* | (2006.01) |
| *G09F 13/00* | (2006.01) |
| *F16M 13/02* | (2006.01) |
| *G09F 7/08* | (2006.01) |

(52) U.S. Cl.
CPC ............... *G09F 7/18* (2013.01); *F16M 13/02* (2013.01); *G09F 7/08* (2013.01); *G09F 13/00* (2013.01); *G09F 2007/1847* (2013.01); *G09F 2007/1856* (2013.01)

(58) Field of Classification Search
CPC .............. E04D 13/072; E04D 13/0722; E04D 13/0725; E04D 13/0727
USPC .............. 248/237, 48.1, 48.2, 73, 74.1, 74.2
See application file for complete search history.

(56) References Cited

U.S. PATENT DOCUMENTS

| | | |
|---|---|---|
| 3,599,916 A | 8/1971 | Szabo |
| 5,566,058 A | 10/1996 | Protz, Jr. |
| 5,669,709 A | 9/1997 | Adams |
| 6,352,291 B1 | 5/2002 | Tortajada |
| 6,644,836 B1 | 11/2003 | Adams |
| 8,888,337 B2 | 11/2014 | Adams |
| 9,702,503 B2 | 7/2017 | Chi Man |
| 2003/0198054 A1* | 10/2003 | Adams ................ F21V 21/08 362/396 |
| 2004/0129846 A1 | 7/2004 | Adams |
| 2007/0204521 A1* | 9/2007 | Jackson ................ A61K 9/70 52/11 |
| 2011/0107683 A1* | 5/2011 | Ringuette ............ E04D 13/064 52/12 |
| 2011/0185641 A1* | 8/2011 | Snell .................. E04D 13/076 52/12 |

(Continued)

*Primary Examiner* — Steven M Marsh
(74) *Attorney, Agent, or Firm* — Wayne State University Patent Clinic

(57) ABSTRACT

A device is used for affixing structural elements such as signs or cameras to a gutter, and a system for mounting the device. One end of the device has a spiral curvature of sufficient size and flexibility to be opened and placed on a gutter with enough tension to prevent dislodging from the elements, as well as a support extending from the spiral to form a point of contact with any structural element held by the device. A second end of the device includes an opening to allow various structural elements to be affixed to the device and fully supported. Between the one end and the second end is a positioning piece that lies against the gutter face to support the structural elements.

20 Claims, 3 Drawing Sheets

(56) References Cited

U.S. PATENT DOCUMENTS

2016/0312949 A1\* 10/2016 Chi Man .............. F16M 13/022

\* cited by examiner

STRUCTURAL SIGN MOUNTS FOR GUTTERS

This application claims the benefit of U.S. Provisional Application No. 62/763,276, filed on Jun. 11, 2018, entitled Methods of Mounting Sign with Hook, which is hereby incorporated herein by reference in its entirety.

BACKGROUND

This invention is directed to the field of gutter attachments. More specifically, to structural attachments that can support signs of substantial weight and other attachments.

As is well appreciated in the art, many buildings in temperate climates have gutters or eavestroughs and downspouts to collect rainwater and divert it away from the building. By the early 18$^{th}$ century the use of gutters became an accepted addition to buildings. Improvements have been made to gutters over time to change them from not only practical drainage components, but also aesthetically attractive details such as crown molding profiles.

More recently, gutters have been utilized to display decorative strings and lights during the holiday seasons. Lightweight plastic hooks with diminutive profiles have been disclosed as suitable for hanging such decorative strings and lights. However, it would be advantageous to hang heavier items and systems from gutters in a stable manner such that the items will stay in position and not be blown off by winds that can be common during winter months.

As is well appreciated in the art, it is preferred for exterior clips to be unobtrusive. As such, known designs focus on minimizing the size and appearance of gutter clips. These designs are for hanging holiday lights and other lightweight rope items. For example, U.S. Pat. No. 9,702,503 B2 to Chi Man discloses a device configured to secure ornamental light strings to exterior surfaces. The device includes a pole adaptor attachment, a first clip with a bottom section, and a second clip with a short tab projecting away from the clip. Because this clip is designed for hanging lightweight ropes, this is not suitable for supporting signs securely to gutters.

U.S. Pat. Pub. No. 2004/0129846 A1 to Adams discloses an apparatus for hanging decorative lights from a rail or gutter. The device has a ribbon-shaped body with a curvature that can enable a spiral end to be opened and placed on a rail or post with at least one substantially flat side. The spiral end has at least one flat segment that is positioned to press against the substantially flat side of the rail or post to prevent the device from being dislodged by winter winds. The hook has a second end that defines at least one opening of size to hold a decorative light socket, rope light, or electrical cord. This also is not suitable for securely supporting structural signs.

U.S. Pat. No. 6,644,836 B1 to Adams discloses an apparatus for hanging rope lights from a gutter. The apparatus has a spiral that fits on a gutter and a hook at an opposite end to receive a rope light. The apparatus has a body shaped such that the hook is facing the wall of the gutter. Curved sections can be added to the body between the hook and the spiral to receive additional rope lights, or a hook may be used to hold lightweight rope lights above the top lip of the gutter or next to the flat portion at the top of a gutter.

U.S. Pat. No. 6,352,291 B1 to Tortajada discloses an implement and system for remotely affixing and removing decorations and other objects. The article can affix and remove strands of lights or other decorations from a fixed object such as roofs, gutters, or trees. A temporary hanger may be used in connection with the positioning element, and in that case, the temporary hanger is put in place on a fixed object. In position, the temporary hanger can hold a decorative article, such as a strand of lights.

A need exists for a hook apparatus to attach or hold structural signs and other cumbersome or weighty objects securely to a gutter.

SUMMARY

A structural sign mount for gutters is provided, including an elongated body with a first end and a second end. The first end of the elongated body includes a gutter engaging portion capable of engaging with a lip of a gutter and a contacting arm extending beyond and above (herein after the word beyond is intended to mean beyond and above) the gutter engaging portion when engaged with a gutter. The second end including a tab attached to the second end and extending beyond the end of the contacting arm, thereby forming a pinch point between the contacting arm and the tab and a channel between the elongated body and the tab. The elongated body further includes a stabilizer disposed between the first end and the second end.

In one embodiment of the gutter mount includes a gutter engaging portion including a spiral. In another embodiment, the gutter mount may include a channel that accommodates a sign. In other embodiments, the gutter mount may include a channel that accommodates a camera. In another embodiment, the gutter mount may include a channel that accommodates an electronic display. In some embodiments the gutter mount may include a channel that accommodates a light source.

A structural sign mount for gutters may further include an elongated body with a first end and a second end. The first end of the elongated body including a gutter engaging portion capable of engaging with a lip of a gutter and a contacting arm extending beyond the gutter engaging portion. The second end including a tab attached to the second end and extending beyond the end of the contacting arm, thereby forming a first pinch point between the contacting arm and the tab and a channel between the elongated body and the tab. This embodiment may further be configured to accommodate a bracket. The elongated body further includes a stabilizer disposed between the first end and the second end, and a second pinch point disposed in the channel between the first end and the second end.

In one embodiment of the gutter mount includes a gutter engaging portion including a spiral. In another embodiment, the bracket may be attached to a sign. This sign may further include a light source. In other embodiments, the bracket is attached to a camera. In another embodiment, the bracket may be attached to an electronic display. In some embodiments, the second pinch point is disposed in the channel between the stabilizer and the second end.

A structural sign mount system for gutters may further include a gutter, and an elongated body with a first end and a second end. The first end of the elongated body including a gutter engaging portion capable of engaging with a lip of a gutter and a contacting arm extending beyond the gutter engaging portion. The second end including a tab attached to the second end and extending beyond the end of the contacting arm, thereby forming a first pinch point between the contacting arm and the tab and a channel between the elongated body and the tab. This embodiment may further include a bracket removably attached to the tab. The elongated body may further include a stabilizer disposed between the first end and the second end, and a second pinch point disposed in the channel between the first end and the second end.

In some embodiments the system includes a gutter engaging portion in the shape of a spiral. In another embodiment, the system may include a camera attached to the bracket. In some embodiments, the system includes an electronic display attached to the bracket. In another embodiment the system includes a sign attached to the bracket. In other embodiments, the sign may further include a light source. Some embodiments may further include a system where the second pinch point is disposed between the stabilizing element and the second end.

DETAILED DESCRIPTION

The following detailed description is of the best currently contemplated mode of practicing the invention. The description is not to be taken in in a limiting sense, but is merely for the purpose of illustrating the general principles of the invention since the scope of the invention is best defined by the appended claims.

Figure 1:
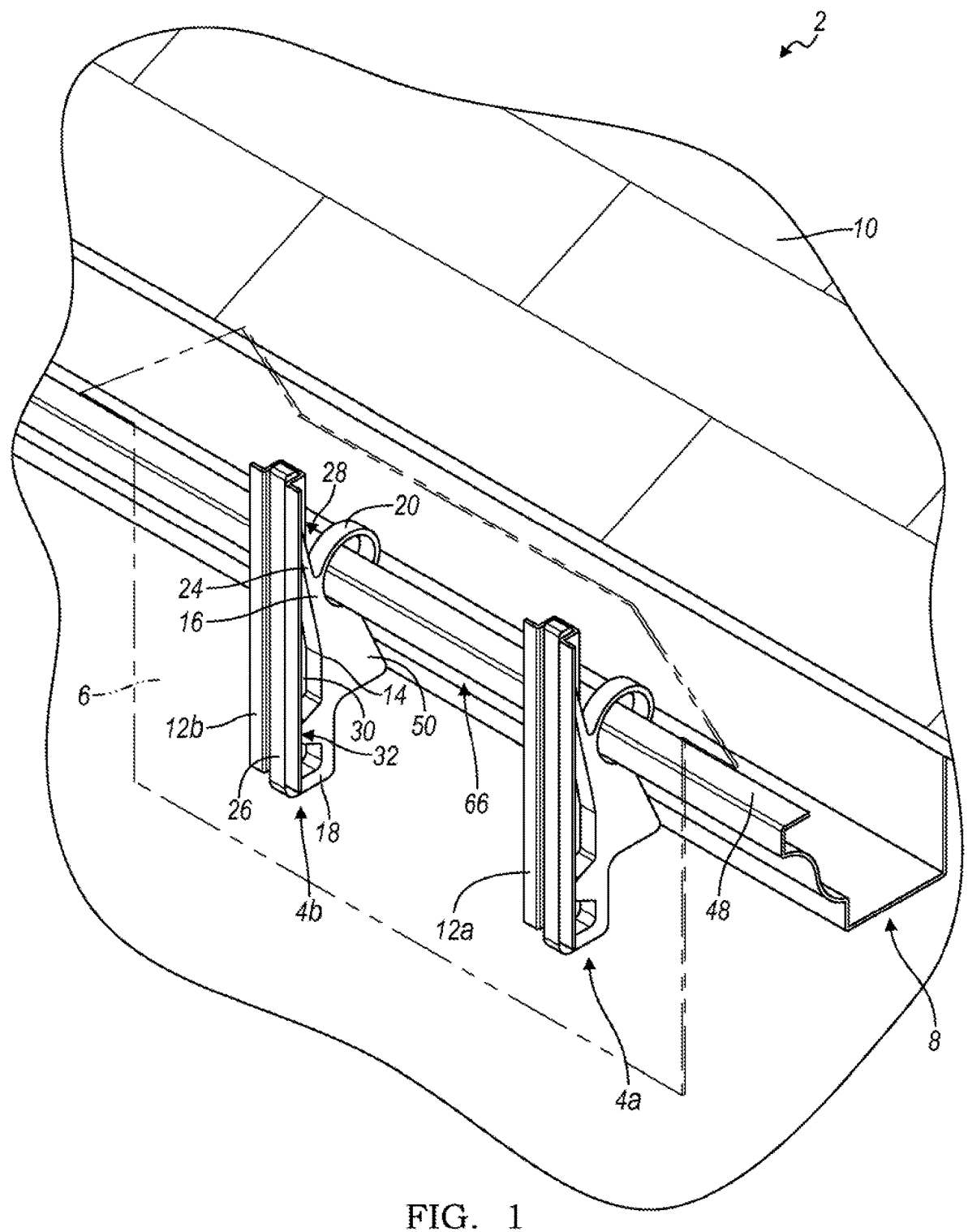
FIG. 1 is a view of a structural sign mount in use on a gutter of a house.

A gutter mount is disclosed. Referring to FIG. 1, the exterior of a building with a sign displayed 2 is shown. In one embodiment, two gutter mounts 4a and 4b provide a structure to hold a display sign 6 in a desired upright position and secure the display sign at a desired position on a gutter 8 of a building 10. The two gutter mounts hang on the gutter and are shaped to accommodate removable brackets 12a and 12b that are attached to the display sign 6. In some embodiments with smaller attachments, there may be one mount. In other embodiments such as when the sign is large, there may be more than two gutter mounts.

Figure 2:
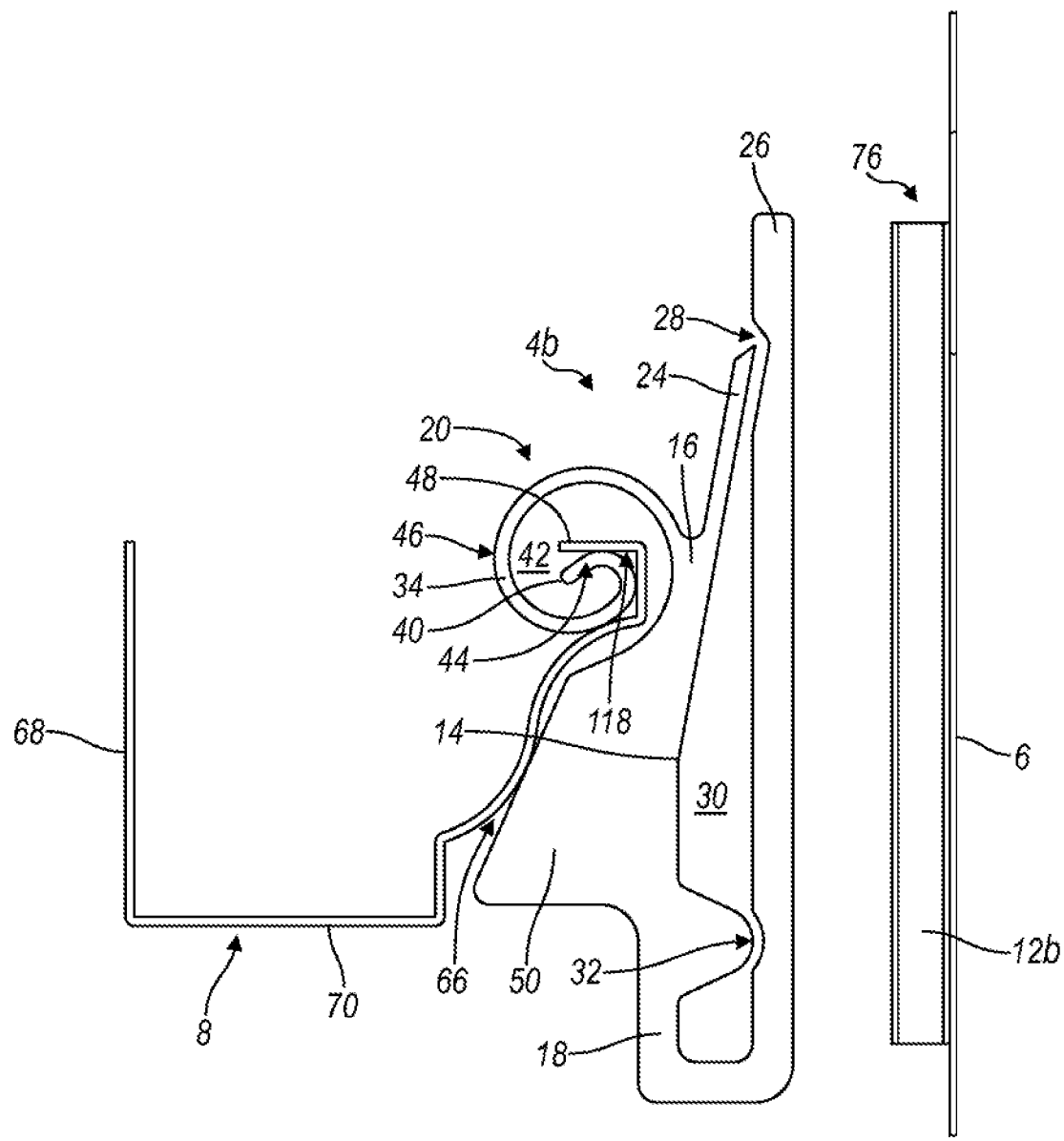
FIG. 2 is a side perspective view of a structural sign mount on a gutter, with a bracket attached to a sign.

Gutters may have different designs, such as the half-round or K-styles. The front face of a gutter may be shaped to mimic crown-molding profiles including colonial, two-step, or straight. The gutter 8 featured in FIG. 2 is a K-style colonial gutter with a front face 66, a rear wall 68, a bottom 70 connecting the front face to the rear wall, and a gutter lip 48 extending from the front face.

Referring to FIG. 1, a gutter mount 4b has an elongated body 14 with a first end 16 and a second end 18. The first end 16 of the gutter mount 4b may comprise a gutter engaging portion 20 capable of engaging with a gutter lip 48, and a contacting arm 24 that extends beyond the gutter engaging portion 20. The second end 18 of the gutter mount 4b may be attached to a tab 26 that extends beyond the end of the contacting arm 24 of the gutter mount 4b, creating a pinch point 28 between the contacting arm and the tab, and defining a channel 30 between the elongated body and the tab. A second pinch point 32 may be disposed in the channel 30 between the first end 16 and the second end 18.

In some embodiments, the gutter engaging portion 20 may include a spiral. As seen in FIG. 2, the spiral 34 extends away from the elongated body 14 of the gutter mount 4b, and has a proximal point 40 in the center of the curve that is adjacent to the elongated body 14 and creates a space 42 between the inner curve 44 of the spiral 34 and outer curve 46 such that the proximal point 40 of the spiral fits inside the inner surface 118 of the gutter lip 48 to securely hold the gutter mount 4b. The spiral 34 may have a different profile to match a different gutter profile. In some embodiments the spiral may be tighter to secure to a smaller gutter lip. In other embodiments, the spiral may be wider to accommodate a larger gutter lip.

Alternatively, in some embodiments the gutter engaging portion may be a hook, or an angled support. In some embodiments it may be a spring clip, or clamp, snap, or other tension mechanism. In other embodiments the gutter engaging portion may be a pair of rare earth magnets, or a vise. The gutter engaging portion can take many forms so long as it securely holds the gutter mount to the gutter lip.

The elongated body of the gutter mount can be made of any material such that the spiral can be flexed open to fit over the lip of a gutter. The material may be resilient or rigid. In some embodiments the elongated body of the gutter mount may be made of nylon, in other embodiments the elongated body of the gutter mount may be made of aluminum. Additionally, polypropylene, polycarbonate, polyethylene, HDPE, and steel are suitable substrates.

The gutter mount may have a thickness. In some embodiments, the gutter mount may have a thickness of approximately 0.25-3 inches, preferably 0.5-1.5 inches, optimally 0.5 inches. The elongated body may be of varying size and dimension depending on the weight of the attachment it supports, as well as to accommodate different size gutters.

Referring to FIG. 1, in addition to the gutter engaging portion 20, the elongated body 4b includes a stabilizer 50 disposed between the first end 16 and the second end 18. The stabilizer 50 can take any number of different forms so long as it contacts the outside face 66 of the gutter 8 to maintain an upright position of the sign 6 or other item of display.

As is shown in FIG. 1, the gutter mount 4b may include a bracket 12b that is removably attached to the gutter mount tab 26. There may be at least one gutter mount 4b and at least one bracket 12b, the at least one bracket attached to a sign 6 for display. The at least one gutter mount 4b may be placed on a gutter 8, where the bracket 12b attached to the sign 6 can slide over the at least one gutter mount tab 26 such that the bottom of the bracket contacts the bottom of the channel 30, and is further supported by the two pinch points created by the contacting arm 24 and the second pinch point 32. In some embodiments the sign may include a light source. In some other embodiments, the brackets may be attached to a light source. In other embodiments the brackets may be attached to an electronic display. In some embodiments, the brackets may be attached to a camera.

Figure 3:
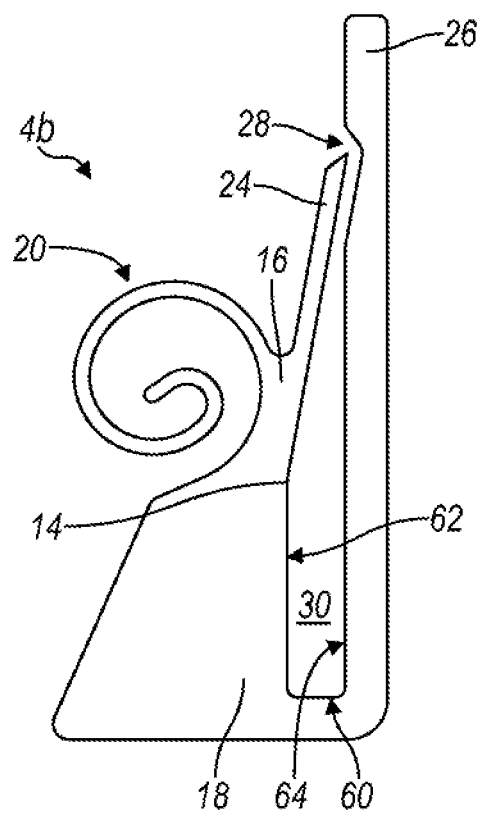
FIG. 3 is a side perspective view of a structural sign mount.

In other embodiments, such as FIG. 3, a sign may be disposed in the channel 30 between the elongated body 14 and the gutter mount tab 26. In such embodiments, the walls of the channel 30 may support the sign. The bottom of a sign may contact the inside bottom 60 of the channel 30, and is further supported by the inside face of the tab 62 and the inside face of the elongated body 64.

Referring to FIG. 1, the sign 6 may include a light source. In some embodiments, it may be advantageous to include a light source to illuminate the sign, allowing it to be more visible from a distance from the building. In this embodiment, the light source may be powered by solar, or battery, or alternating current, and the light may be LED, or fluorescent, or halogen, or incandescent.

Referring to FIG. 2, a profile view of the embodiment shown in FIG. 1 is provided. In this embodiment, the gutter engaging portion 20 includes a spiral 34 hooked around the gutter lip 48, such that the proximal point 40 of the spiral 34 fits inside the inner surface 118 of the gutter lip 48. The stabilizer 50 makes contact with the front face of the gutter 66 to support the weight of a structure 76 to be displayed on it, and to prevent the gutter mount from being dislodged by wind. In FIG. 2, the gutter mount may hold a sign 6 with an attached bracket 12b. The bracket 12b may be sized to slide over the gutter mount tab 26.

In FIG. 2, the second pinch point 32 is placed close to the second end 18 of the elongated body 14, so that it may make contact with the bottom of the bracket 12b, while the contacting arm 24 may make contact with the top of the bracket 12b forming the first pinch point 28. This configuration may be useful to distribute the load from the weight of the sign 6 so that the sign 6 may be held securely upright. The second pinch point 32 may be placed anywhere that securely holds the sign 6. In other embodiments, the second pinch point may be closer to the middle of the elongated body. In some embodiments, the second pinch point may be closer to the first end of the elongated body.

In an alternative embodiment as shown in FIG. 3, the gutter mount 4b has an elongated body 14 with a first end 16 and a second end 18. The first end 14 of the gutter mount 4b may comprise a gutter engaging portion 20 capable of engaging with a gutter lip, and a contacting arm 24 that extends beyond the gutter engaging portion 20. The second end 18 of the gutter mount 4b may include an attached tab 26 that extends beyond the length of the contacting arm 24 of the gutter mount 4b, creating a pinch point 28 between the contacting arm 24 and the tab 26, and defining a channel 30 between the elongated body 14 and the tab 26. This alternative embodiment may be used for supporting lighter weight attachments that need less support than the embodiments shown in FIG. 2.

Figure 4:
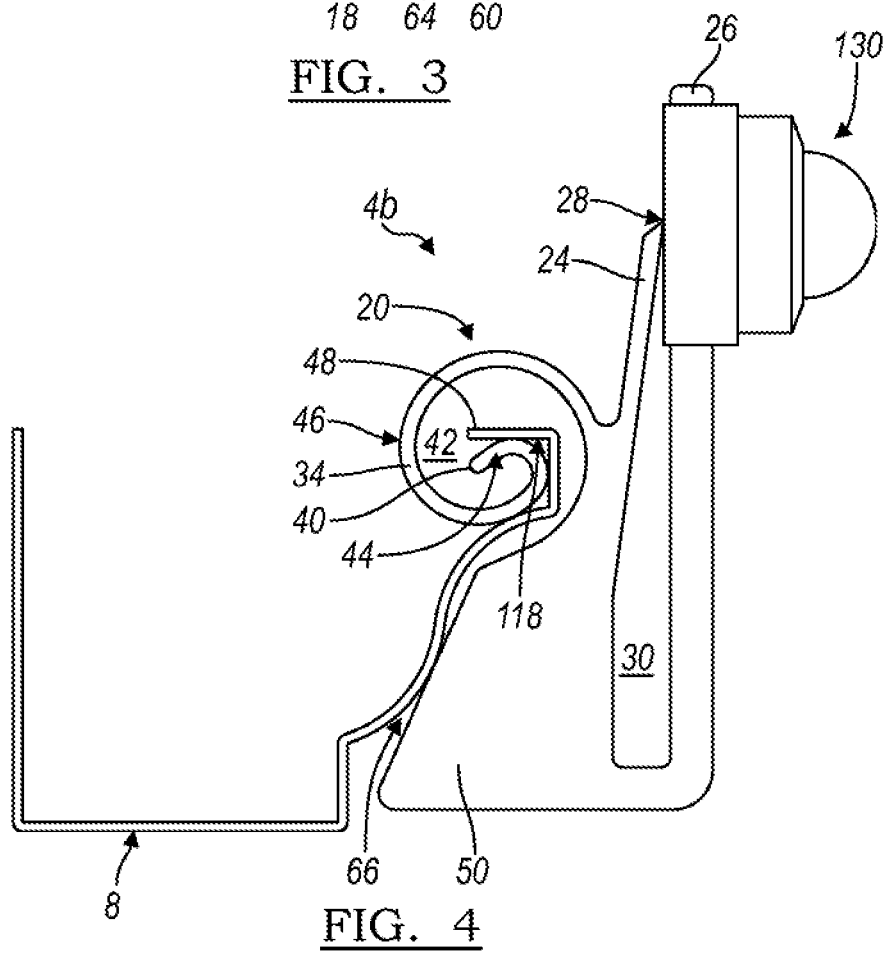
FIG. 4 is a perspective view of a structural sign mount on a gutter, accommodating a camera.

Referring now to FIG. 4, the alternative embodiment of FIG. 3 is shown on the profile of a gutter 8. In this embodiment, the gutter engaging portion 20 includes a spiral 34 hooked around the gutter lip 48. As seen in FIG. 4, the spiral 34 extends away from the elongated body 14 of the gutter mount 4b, and has a proximal point 40 in the center of the curve that is adjacent to the elongated body 14 and creates a space 42 between the inner curve 44 of the spiral 34 and outer curve 46 such that the proximal point 40 of the spiral fits inside the inner surface 118 of the gutter lip 48 to securely hold the gutter mount 4b. The stabilizer 50 makes contact with the front face of the gutter 66 to support the weight of a structure to be displayed on it, and to prevent the gutter mount from being dislodged by wind. The channel 30 formed between the tab 26 and the elongated body 14 is shown to accommodate a camera 130 for flexible home protection surveillance. In this embodiment, the camera 130 may slide into the channel 30 and be held in place by the contacting arm 24 forming a pinch pint 28 between the contacting arm 24, the camera 130, and the tab 26. In some embodiments, the channel 30 may accommodate a light source as a beacon or guide to provide a signal for emergency services or to facilitate locating the building. In other embodiments, the channel 30 may accommodate an electronic display.

The gutter mount may be made by any method of manufacture. In some embodiments, the gutter mount is manufactured by injection molding. In some other embodiments the gutter mount may be made by additive manufacturing. The gutter mount may also be die-cut, or it may be made by casting. In even other embodiments, the gutter mount may be hollow, to lighten the weight of the gutter mount and limit the amount of material needed for production.

In use, a user first selects how many gutter mounts will be needed for the particular application. Next, the user wraps the gutter engaging element around the gutter lip. The user may need to adjust the placement of the gutter mounts on the gutter to ensure they are the correct distance apart for the particular display. In an embodiment where a user may wish to place a sign with attached brackets, after placing the gutter mounts, the user may slide the brackets over the corresponding tabs of the gutter mounts until the sign is securely held in place by the first pinch point and the second pinch point. If the user no longer wishes to maintain a display, or wishes to move the display for use on a different building, the user only has to remove the sign from the corresponding tabs, and unhook the gutter engaging element from the gutter lip.

In another embodiment such as FIG. 4, where the user may want to place a camera for a safety system, the user may first wrap the gutter engaging element around the gutter lip. Next, the user may slide the camera onto the tab, where the pinch point will make contact with the back of the camera to hold it securely in place. In some embodiments, the user may want to slide a light source such as a flashing sensor onto the tab, in this embodiment, the pinch point may make contact with the sensor to secure the sensor between the pinch point and the tab.

With respect to the above, it is to be understood that the invention is not limited in its application to the details of construction and to the arrangement of the components listed or the steps set forth in the description or illustrated in the drawings. The various apparatus and systems of the disclosed invention are capable of other embodiments, and of being practiced and carried out in various ways that would be readily known to those skilled in the art, given the present disclosure. Further, the terms and phrases used herein are for descriptive purposes and should not be construed as in any way limiting.

As such, those skilled in the art will appreciate that the conception upon which this disclosure is may be utilized as a basis for designing other inventions with similar properties. It is important therefore that the embodiments, objects, and claims herein, be regarded as including such equivalent construction and methodology insofar as the do not depart from the spirit and scope of the present invention. It should be noted that the components in the figures are not necessarily to scale, emphasis instead being placed upon illustrating the principles of the invention.

We claim:

1. A structural sign mount for gutters, comprising:
   an elongated body with a first end and a second end;
   the first end comprising a gutter engaging portion capable of engaging a gutter and a contacting arm having a proximal end, adjacent to the first end of the elongated body, and a distal end extending above the gutter engaging portion when engaged with a gutter;
   a tab adjacent to the second end of the elongated body and extending to a point approximately at or above the distal end of the contacting arm, when engaged with a gutter, thereby forming a pinch point between the contacting arm and the tab and a channel between the elongated body and the tab; and
   a stabilizer disposed between the first end and the second end.

2. The apparatus of claim 1 wherein:
   the gutter engaging portion comprises a spiral.

3. The apparatus of claim 1 wherein:
the channel accommodates a sign.

4. The apparatus of claim 1 wherein:
the channel accommodates a camera.

5. The apparatus of claim 1 wherein:
the channel accommodates an electronic display.

6. The apparatus of claim 1 wherein:
the channel accommodates a light source.

7. A structural sign mount for gutters, comprising:
an elongated body with a first end and a second end:
the first end comprising a gutter engaging portion capable of engaging a gutter and a contacting arm having a proximal end, adjacent to the first end of the elongated body, and a distal end extending above the gutter engaging portion when engaged with a gutter;
a tab adjacent to the second end of the elongated body and extending to a point approximately at or above the distal end of the contacting arm, when engaged with a gutter, thereby forming a pinch point between the contacting arm and the tab and a channel between the elongated body and the tab;
the tab configured to accommodate a bracket;
a stabilizer disposed between the first end and the second end; and
a second pinch point disposed in the channel between the first end and the second end.

8. The apparatus of claim 7 wherein:
the gutter engaging portion comprises a spiral.

9. The apparatus of claim 7 wherein:
the bracket is attached to a sign.

10. The apparatus of claim 7 wherein:
the bracket is attached to a camera.

11. The apparatus of claim 7 wherein:
the bracket is attached to an electronic display.

12. The apparatus of claim 9 wherein:
the sign further comprises a light source.

13. The apparatus of claim 7 wherein:
the second pinch point is disposed in the channel between the stabilizer and the second end.

14. A structural sign mount system for gutters, comprising:
a gutter; and
an elongated body with a first end and a second end:
the first end comprising a gutter engaging portion capable of engaging with a lip of the gutter and a contacting arm extending beyond the gutter engaging portion and above the lip of the gutter;
the second end comprising a tab attached to the second end and extending beyond the contacting arm thereby forming a first pinch point between the contacting arm and the tab and a channel between the elongated body and the tab;
a bracket removably attached to the tab;
a stabilizer in contact with the gutter and disposed between the first end and the second end; and
a second pinch point disposed in the channel between the first end and the second end.

15. The system of claim 14 wherein:
the gutter engaging portion comprises a spiral.

16. The system of claim 14 wherein:
the bracket is attached to a camera.

17. The system of claim 14 wherein:
the bracket is attached to an electronic display.

18. The system of claim 14 wherein:
the bracket is attached to a sign.

19. The system of claim 18 wherein:
the sign further comprises a light source.

20. The system of claim 14 wherein:
the second pinch point is disposed between the stabilizing element and the second end.

\* \* \* \* \*